(12) United States Patent
Aziz et al.

(10) Patent No.: US 10,339,511 B2
(45) Date of Patent: Jul. 2, 2019

(54) ADJUSTMENT OF A SECURITY LEVEL OF A TRANSACTION SYSTEM BASED ON A BIOMETRIC CHARACTERISTIC OF A CUSTOMER

(71) Applicant: Toshiba Global Commerce Solutions Holdings Corporation, Tokyo (JP)

(72) Inventors: Bilal Aziz, Durham, NC (US); Dean F. Herring, Youngsville, NC (US); Brad M. Johnson, Raleigh, NC (US); Jeffrey J. Smith, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 475 days.

(21) Appl. No.: 14/324,198

(22) Filed: Jul. 6, 2014

(65) Prior Publication Data

US 2014/0330655 A1    Nov. 6, 2014

Related U.S. Application Data

(63) Continuation of application No. 13/074,814, filed on Mar. 29, 2011, now Pat. No. 8,812,367.

(51) Int. Cl.
*G06Q 20/20* (2012.01)
*G06Q 20/40* (2012.01)
*G06Q 20/38* (2012.01)

(52) U.S. Cl.
CPC .......... *G06Q 20/20* (2013.01); *G06Q 20/382* (2013.01); *G06Q 20/405* (2013.01); *G06Q 20/40145* (2013.01)

(58) Field of Classification Search
None
See application file for complete search history.

(56) References Cited

U.S. PATENT DOCUMENTS

| 5,764,789 | A  | * | 6/1998 | Pare, Jr. | G06F 21/32 |
| | | | | | 382/115 |
| 6,789,189 | B2 | | 9/2004 | Wheeler et al. | |
| 6,794,586 | B1 | * | 9/2004 | Mason | G01G 19/4144 |
| | | | | | 177/185 |
| 2003/0101136 | A1 | | 5/2003 | Wheeler et al. | |
| 2004/0133477 | A1 | * | 7/2004 | Morris | A47F 9/047 |
| | | | | | 705/21 |

(Continued)

FOREIGN PATENT DOCUMENTS

WO    03/057003 A2    7/2003

OTHER PUBLICATIONS

Lie Detection—Recovery of the Periorbital Signal through Tandem Tracking and Noise Suppression in Thermal Facial Video, Tsiamyrtzis et al., Proc. of SPIE vol. 5778, p. 555, Mar. 2005.

(Continued)

*Primary Examiner* — Paul Danneman
(74) *Attorney, Agent, or Firm* — Olive Law Group, PLLC

(57) ABSTRACT

Methods and systems for adjusting a security level of a transaction system based on biometric characteristics of a customer are disclosed. According to an aspect, a method includes interacting with a customer at a transaction terminal. The method also includes determining a biometric characteristic of the customer based on the interaction with the customer. Further, the method may include adjusting a security level of a transaction system based on the biometric characteristic.

18 Claims, 3 Drawing Sheets

(56) References Cited

U.S. PATENT DOCUMENTS

| | | | |
|---|---|---|---|
| 2005/0018883 A1* | 1/2005 | Scott | G06Q 20/382 |
| | | | 382/115 |
| 2007/0038035 A1 | 2/2007 | Ehrlich et al. | |
| 2008/0104415 A1* | 5/2008 | Palti-Wasserman | G06F 21/32 |
| | | | 713/186 |
| 2009/0327131 A1* | 12/2009 | Beenau | G06Q 20/32 |
| | | | 705/44 |
| 2010/0332390 A1 | 12/2010 | Paintin | |
| 2012/0253953 A1 | 10/2012 | Aziz et al. | |

OTHER PUBLICATIONS

The Physiology of Threat: Remote Assessment Using Laser Doppler Vibrometry, Rohrbaugh et al. Proc. of SPIE vol. 5778, p. 567, Mar. 2005.
Eye Movement-Based Memory Assessment (EMMA), Veridical Research and Design Corporation, Bozeman, MT, Proc. of SPIE vol. 5778, p. 572, Mar. 2005.
New Methods of Operational Interviewing: Utilizing Non-Contact Sensors, Andrew H. Ryan, Jr., Dept. of Defense, University of Houston, Washington Univ., Veridical Research, Sensors, and C3I Technologies for Homeland Security and Homeland Defense IV, Proceedings of SPIE, vol. 5778, p. 553, 2005.
Office Action dated Aug. 5, 2013 for U.S. Appl. No. 13/074,814.
Office Action dated Mar. 28, 2013 for U.S. Appl. No. 13/074,814.
Notice of Allowance dated Jun. 9, 2014 for U.S. Appl. No. 13/074,814.

* cited by examiner

ADJUSTMENT OF A SECURITY LEVEL OF A TRANSACTION SYSTEM BASED ON A BIOMETRIC CHARACTERISTIC OF A CUSTOMER

CROSS REFERENCE TO RELATED APPLICATION

This application claims the benefit of and priority to U.S. patent application Ser. No. 13/074,814, filed Mar. 29, 2011 and titled ADJUSTMENT OF A SECURITY LEVEL OF A TRANSACTION SYSTEM BASED ON A BIOMETRIC CHARACTERISTIC OF A CUSTOMER; the content of which is incorporated by reference in its entirety.

BACKGROUND

Field of the Invention

The present invention relates to electronic transactions, and more specifically, to adjustment of a security level of a transaction system.

Description of Related Art

Self-checkout systems have become common in retail stores for providing customers with the ability to pay for purchases from a retailer without direct input to the checkout process by retailer personnel. Such systems are an alternative to traditional cashier-staffed checkout systems. In self-checkout systems, customers are permitted to scan barcodes on their items or products for identifying items to be purchased. Items such as fruits and vegetables may be weighed with a scale and manually identified with a user interface device, such as a touchscreen display. Customers may bag items in a bagging area, and a weight observed in the bagging area may be verified against previously stored information to ensure that the correct item is bagged, allowing the customer to proceed only if the observed and expected weights match. Some self-checkout systems also include devices for verifying that the dimensions of an item match an entered identification of the item.

Self-checkout systems are usually unsupervised or supervised by a customer assistant that is responsible for the oversight of multiple self-checkout systems. Accordingly, the interaction between the customer assistant and the customer is limited, if at all. This represents a downfall associated with self-checkout systems as the customer assistant may not be able to examine the customer for any signs of dishonesty that may indicate that the customer is shoplifting or likely to be shoplifting, whereas a cashier at a conventional checkout system would be able to interface with the customer and may be able to determine that a customer is likely dishonest and more prone to shoplifting.

For at least the aforementioned reasons, it is desired to provide systems and methods for aiding customer assistants in monitoring self-checkout environments.

BRIEF SUMMARY

One or more embodiments of the present invention provide methods and systems for adjusting a security level of a transaction system based on a biometric characteristic of a customer. According to an aspect, a method includes interacting with a customer at a transaction terminal. For example, a customer may interact with a user interface of a self-checkout terminal for conducting a purchase transaction. The method also includes determining a biometric characteristic of the customer based on the interaction with the customer. For example, during the interaction, one or more of the customer's speech pattern, eye movement, facial movement, heart rate, blood pressure, body temperature, and/or perspiration may be detected by the user interface for determining a biometric characteristic of the customer. Further, the method may include adjusting a security level of a transaction system based on the biometric characteristic.

DETAILED DESCRIPTION

Exemplary systems and methods for adjusting security levels of transaction systems based on a biometric characteristic of a customer in accordance with embodiments of the present invention are disclosed herein. Particularly, described herein are systems and methods for determining a biometric characteristic of a customer in response to determining an honesty level of a customer. For example, a system may determine an honesty level by presenting one or more questions to the customer and determining a biometric characteristic of the customer based on a response provided by the customer. The biometric characteristic may be determined by one or more of a customer's speech pattern, eye movement, facial movement, heart rate, blood pressure, body temperature, and perspiration production, the like, and/or another physiological or psychological response by the customer. The system may adjust a security level of the transaction system based on the biometric characteristic of the customer. For example, the system may set the security level of the transaction system to one of several security levels, and may implement a predetermined action associated with the security level. Example actions that may be implemented include, but are not limited to, adjusting product checkout criteria of the transaction system.

Figure 1:
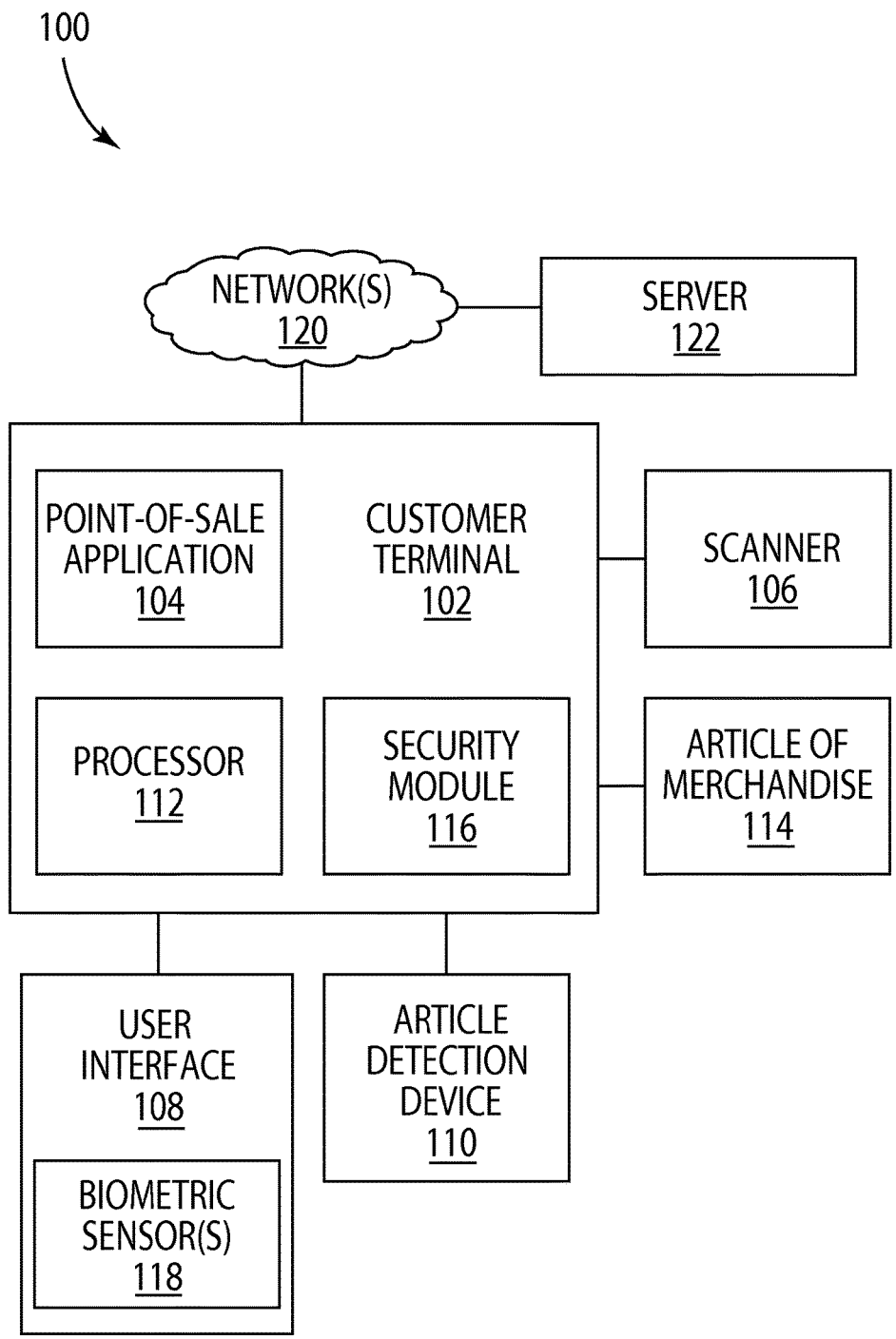
FIG. 1 is a block diagram of a transaction system according to embodiments of the present invention.

FIG. 1 illustrates a block diagram of a transaction system 100 according to embodiments of the present invention. The transaction system 100 may be implemented in any transactional environment, such as, for example, a self-checkout environment. The transaction system 100 may include a customer terminal 102. The customer terminal 102 may include a display screen for interfacing with customers. Particularly, the display screen may provide customers with purchase transaction information, such as itemized purchases and prices, a total cost associated with a purchase, and related purchase transaction information. In one example, the customer terminal 102 may be a self-checkout system in which the customer is responsible for scanning articles of merchandise.

The customer terminal 102 may include a point-of-sale (POS) application 104, and may be in communication with a scanner 106, a user interface 108, and an article detection device 110. The POS application 104 may execute on a processor 112 of the customer terminal 102. The customer terminal 102 may include any suitable hardware, software, and/or firmware for implementing functions and processes in accordance with embodiments of the present invention.

The scanner 106 may be capable of reading data from an article of merchandise 114. The scanner 106 may be a handheld device that can be passed over the universal product code (UPC) on articles of merchandise or may be built into a counter or platform whereby articles or merchandise 114 are passed over the scanner 106. Further, the scanner 106 may read data from articles of merchandise 114 and transmit the data to the customer terminal 102 via, for example, a wireless or wireline connection.

The article detection device 110 may include a scale, sensor, or other instrument that captures information relating to purchase items. In an example, the article detection device 110 may detect the presence of a purchase item at a bagging area. Further, for example, the article detection device 110 may capture weight, dimension, color, and/or other measurements of purchase items. The article detection device 110 may be communicatively coupled to the customer terminal 102 via wireless or wireline elements (e.g., serial cable, 802.11 technologies, and the like).

The user interface 108 may include a keyboard device that enables a customer to enter account and payment information for processing by the customer terminal 102. For example, the user interface 108 may include a scanning device for reading a customer's credit or debit card including account number. The keypad device may enable a customer to enter a personal identification number (PIN) if using a debit card. The user interface 108 may include a display for displaying purchase and transaction information to the customer. For example, the user interface 108 may be a touchscreen display for displaying text and graphics and for receiving user input. The user interface 108 may be communicatively coupled to the customer terminal 102 via wireless or wireline elements.

The POS application 104 may be in communication with a security module 116. The security module 116 may be configured to determine a biometric characteristic of a customer and adjust a security level of the transaction system 110 based on the biometric characteristic. The security module 116 may be embodied on any appropriately configured hardware or device. The sensors may be implemented as part of the user interface 108 or may be stand-alone sensors that are in communication with the customer terminal 102.

The user interface 108 may include one or more biometric sensors 118 that are configured for detecting one or more biometric measurements of a customer. For example, the biometric sensors 118 may be configured for detecting sounds, touch, movement, appearance, the like, and combinations thereof of the customer. For example, a biometric sensor may include a microphone configured to detect a speech or other sounds produced by the customer. In another example, a biometric sensor may be a camera (e.g., a digital video camera or still camera) configured to capture one or more images of the customer. In another example, a touch screen display of the user interface 108 may function as a biometric sensor by detecting a touch of the customer. An electrical signal representative of the detected sound, touch, movement, appearance, the like, or combinations thereof may be communicated to the security module 116. Detection of the biometric measures may occur during and/or based on the interaction with the customer.

The security module 116 may interpret the detected measures as having been produced by the customer, and may determine a biometric characteristic of the customer based on the detected characteristics of the customer. Example biometric characteristic include, but are not limited to, a speech pattern, eye movement, facial movement, heart rate, blood pressure, body temperature, perspiration production, the like, and combinations thereof. The security module 116 may compare the detected characteristics to one or more criteria, such as thresholds, for determining whether to adjust a security level of the transaction system 100 and/or for determining a security level of the transaction system 100.

The control terminal 102 may be in communication with one or more networks 122 with network entities, such as financial institutions. Purchases may be made via the customer terminals 102 whereby the customer terminals 102 facilitate electronic funds transfers over network(s) 110 between customer accounts for one or more financial institutions and an establishment that implements the customer terminal 102 (i.e., a vendor). For this purpose, the customer terminals 102 are communicatively coupled to network(s) 110. The one or more networks 110 may be in communication with a server 122. Server 122 may be a server controlled by the retail or commercial establishment, or may be an external server connected to the one or more networks 110.

Figure 2:
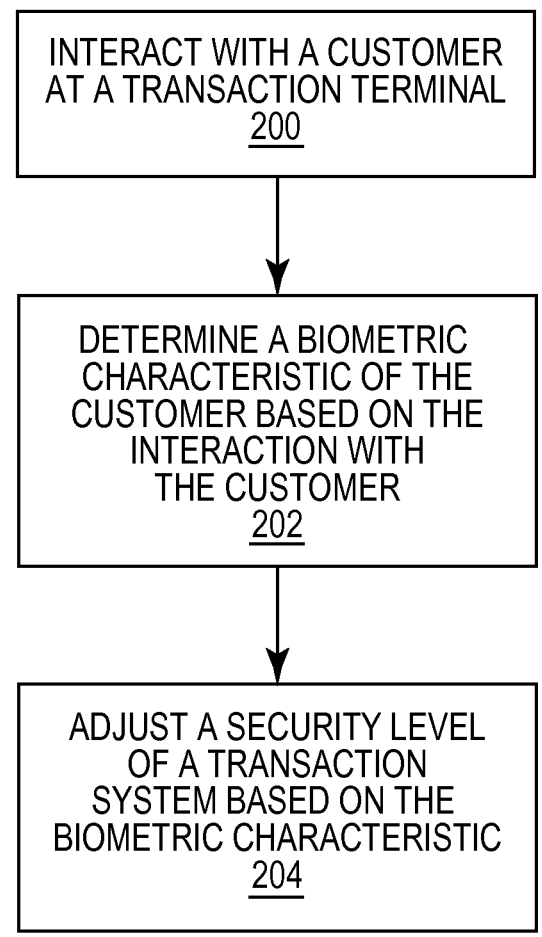
FIG. 2 is a flowchart of a method for adjusting a security level of a transaction system in accordance with embodiments of the present invention.

FIG. 2 illustrates a flowchart of a method for adjusting a security level of a transaction system based on a biometric characteristic of a customer in accordance with embodiments of the present invention. The method of FIG. 2 is described as being implemented by the transaction system 100 shown in FIG. 1, although the method may be implemented by any suitable transaction system.

Referring to FIG. 2, the method includes interacting 200 with a customer at a transaction terminal. For example, the user interface 108 may be configured for interacting with the customer. The user interface 108 may interact with the customer by, for example, presenting one or more questions. For example, the security module 116 may control a display of the user interface 108 to display text of one or more questions to the customer. In another example, the security module 116 may control a speaker of the user interface 108 to emit a recording of one or more spoken questions. In yet another example, the security module 116 may control a display of the user interface 108 to display an image for viewing by the customer. In another example, the security module 116 may control a display screen of the user interface 108 to present one or more images and questions to the customer. In an example, the image may be an image or video of a person who presents the questions to the customer.

The method of FIG. 2 may include determining 202 a biometric characteristic of the customer based on the interaction with the customer. For example, during or subsequent to interaction with the customer, the security module 116 may control the biometric sensor(s) 118 to detect one or more biometric measures of a customer. The user interface 108 may be an interface of a self-checkout system, and may include touch sensors for detecting a biometric measure of the customer. Continuing the example of the user interface 108 presenting questions to the customer, the customer may be prompted to touch icons, enter text, or otherwise interact with a display screen of the user interface 108 for responding to the questions. In another example, the customer may respond with speech, which may be recorded by use of a microphone of the user interface 108. The security module 116 may be configured to control any suitable biometric sensor of the user interface 108 for measuring heart rate, blood pressure, body temperature, and/or perspiration production of the customer as the customer interacts with the system 100. Further, the security module 116 may determine the biometric characteristic based on one or more of the measurements.

The method of FIG. 2 may also include adjusting 204 a security level of a transaction system based on the biometric characteristics. For example, the security module 116 may adjust a security level of the transaction system 100 based on one or more of the determined biometric characteristics. The security level may be one of several security levels for the transaction system 100. In an example, the transaction system 100 can be set to a security level based on biometric characteristics or one or more other security-related events or characteristics. Each security level may define a predetermined action to be implemented when the transaction system 100 is set to the security level. Example actions include, but are not limited to, adjusting product checkout criteria of one or more customer terminals of a transaction system.

Figure 3:
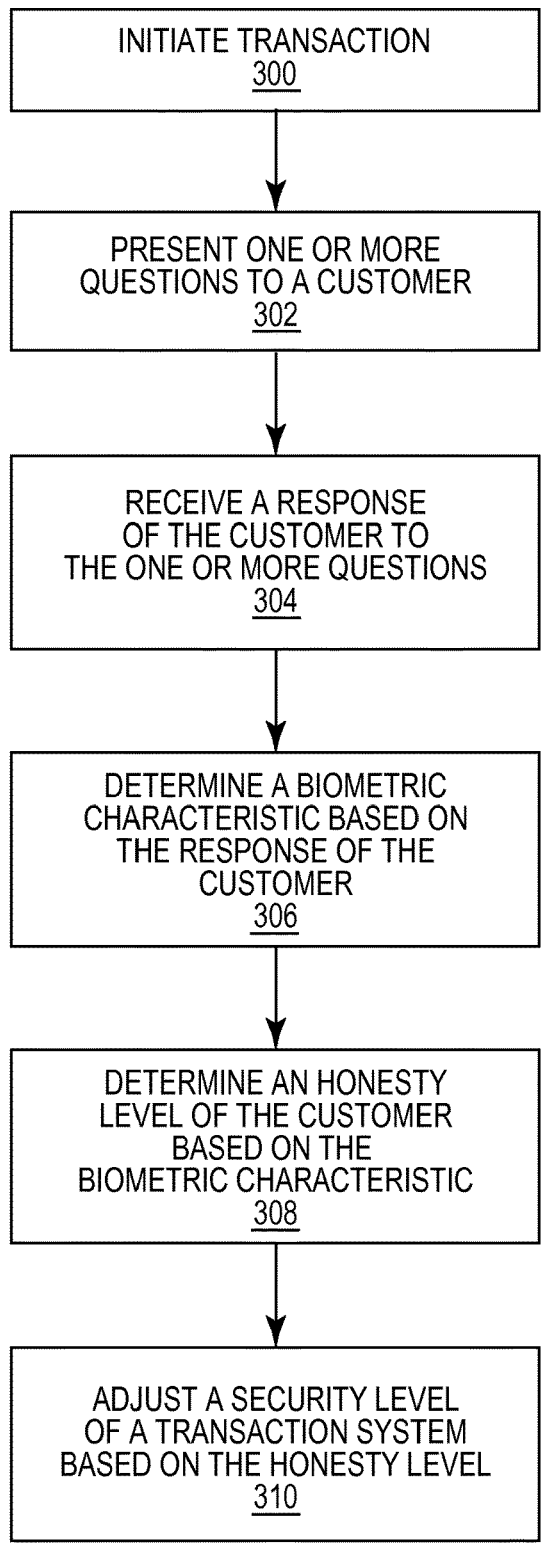
FIG. 3 is a flowchart of another method for adjusting a security level of a transaction system in accordance with embodiments of the present invention.

In accordance with embodiments of the present invention, FIG. 3 illustrates a flowchart of another example of a method for adjusting a security level of a transaction system. The method of FIG. 3 is described as being implemented by the transaction system 100 shown in FIG. 1, although the method may be implemented by any suitable transaction system. The method may be implemented by hardware, software, and/or firmware of the customer terminal 102, and/or another computing device, such as a server.

Referring to FIG. 3, the method includes initiating 300 a transaction in a transaction environment. For example, a transaction may be initiated when a purchase transaction starts at a customer terminal, such as customer terminal 102 shown in FIG. 1. The transaction may initiate, for example, when an item to be purchased is scanned by the scanner 106. In another example, a transaction may be initiated in the case of a customer scanning an article of merchandise at a price check module. In another example, a transaction may be initiated upon detection that a customer is in proximity to or within a checkout area. In another example, a transaction may be initiated by the customer using a computing device, such as, but not limited to, a personal computer, a smart phone or other suitable device, to purchase one or more items of merchandise.

The method of FIG. 3 includes presenting 302 one or more questions to a customer. The question(s) may be selected to invoke a response from the customer for creating an elevated intrinsic or behavioral trait or action from the customer suitable for measuring a biometric characteristic. The question(s) may be designed for use in determining the customer's honesty. For example, the question may ask whether the customer intends to shoplift. In this example, an increase in heart rate of the customer may be indicative of a customer's plan to shoplift, and thus a security level may be adjusted based on the change in heart rate of the customer. In another example, the question may be designed to gage the customer's satisfaction with the store or establishment. Questions may be presented to the customer in conjunction with the display of an image or video depicting, for example, a person's image.

The method of FIG. 3 includes receiving 304 a response of the customer to the one or more question(s). The response may be received by, for example, the customer selecting a touch-sensitive area of a touch screen display of the user interface 108. In another example, a response may be received by a microphone configured to detect an audible response or speech of the customer. In these examples, the security module 116 may receive data representative of the customer's response and may interpret the data as a biometric characteristic of the customer. In another example, a response may be detected when a customer touches a biometric sensor configured to generate an electrical signal representative of the customer's touch. In this example, the biometric sensor 118 may be a sensor configured to detect a customer's touch that can be used to measure the customer's heart rate, blood pressure, body temperature, perspiration of the customer, or the like. In another example, a response may be received if the customer responds to a question in a manner in which a biometric characteristic may be determined based on the movement, or lack of movement, of the customer. For example, the biometric sensor 118 may be a video camera configured to capture images of the customer for use in determining one or more biometric characteristics of the customer.

The method of FIG. 3 includes determining 306 a biometric characteristic based on the response of the customer. For example, continuing the example of the customer touching a touch-sensitive area of a touch screen display, detection of an elevated heart rate may be indicative of a biometric characteristic that the customer may be dishonest. In another example, an elevated heart rate in the presence of increased perspiration may be indicative of another biometric characteristic. In the example of capturing an image of the customer, an image of the customer in which the customer is shielding or covering his or her face may be indicative of a biometric characteristic that the customer may be dishonest.

The method of FIG. 3 includes determining 308 an honesty level of the customer based on the biometric characteristic. The security module 116 may be configured for determining an honesty level of the customer based on the measurements of the biometric sensor(s) 118. In an example, the security module 116 may determine that one or more biometric characteristics indicate that the customer either likely honest or not likely honest. In this example, the security module 116 can adjust the honesty level to a "likely honest" level or "not likely honest" level for the customer. In another example, the honesty level may be a plurality of honesty levels having a reference value indicative of the determined honesty level for each respective customer.

The method of FIG. 3 includes adjusting 310 a security level of a transaction system based on the honesty level. For example, the transaction system may be the system 100 of FIG. 1. The security module 116 may adjust the security level of the transaction system based on the honesty level. The security level may be one of several security levels for the transaction system 100. In an example, the transaction system 100 can be set to a security level based on the honesty level of a customer. Further, each security level may define a predetermined action to be implemented when the transaction system 100 is set to the selected security level. Example actions include, but are not limited to, adjusting product checkout criteria of one or more customer terminals of a transaction system.

In accordance with embodiments of the present invention, adjusting product checkout criteria may include, for example, increasing a match level required to verify a product or item when comparing a measurement of the product or item and product checkout criteria. The article detection device 110 may capture weight, dimension, color, and/or other measurements of purchase items. The captured weight, dimension, color, and/or other measurements may be compared to expected measurements of the item to determine if the item measurements are within a tolerance range. The action may include narrowing or reducing the tolerance range such that the item measurements must more closely match the expected measurements. If item measurements do not fit within the narrowed or reduced tolerance range, the corresponding transaction may be held up, or a notification may be sent to a customer assistant terminal. As a result of this action, security of the system may be increased.

In accordance with embodiments of the present invention, security levels, actions to be implemented at security levels, and honesty levels based biometric characteristics of a customer may be configured based on user-defined criteria. For example, a user of a transaction system may generate or edit a security level list for associating one or more security levels in the list with an action as described herein. Further, for example, a user may specify honesty levels based on biometric characteristics for association with one or more security levels in the list. In this example, when the specified biometric characteristic is detected or reported, the system will enter the security level associated with the specified biometric characteristic. If an action is associated with the security level, the system may implement the associated action.

In accordance with embodiments of the present invention, an association of a security level with an action may be based on user-defined criteria. For example, user-defined criteria may specify a plan of a transaction environment. Based on the plan, a user-defined action may adjust a product checkout criteria at one or more customer terminals in a transaction system. For example, an action may include increasing a match level required to verify a product or item when comparing a measurement of the product or item and product checkout criteria. The match level may be increased at a customer terminal in which the level of honesty is relatively low. Additionally, in systems in which multiple customer terminals may be provided, the customer terminals that are more remote from, for example, a customer assistant terminal may have adjusted security levels that are higher than adjusted security levels of customer terminals that are more closely-spaced to a customer assistant terminal.

In accordance with embodiments of the present invention, security levels may be set based on a number and/or value of one or more biometric characteristics of a customer. For example, the security module 116 may set a security of the system to a predetermined security level based on determined biometric characteristics of a customer. For example, if no biometric characteristics have been determined, the security level may be set to or maintained at a normal level. In response to determining biometric characteristics associated with dishonest behavior, the security module 116 may adjust the security level to a high level. Further, for example, increased security may be implemented if a high number of biometric characteristics associated with a low level of honesty of a respective customer are determined. If no biometric characteristics associated with a low level of honesty of a respective customer are determined, the system may be at a normal security level in which no security actions are implemented. The actions associated with each security level may differ.

In an example of determining a biometric characteristic of a customer, facial expressions may be detected and interpreted for determining a biometric characteristic of a customer. For example, a digital still or video camera may capture one or more images of a face of a customer. The security module may identify features of the face for determining a facial expression of the customer. In an example, the facial expression may be associated in time with the presentation of questions to the customer in accordance with embodiments of the present disclosure. In another example, the security module may use the determined facial expressions for determining an honesty level of the customer. The security module may adjust the security level of the system based on the facial expressions of the customer.

In accordance with embodiments of the present invention, a security module as disclosed herein may be implemented on any computing device suitable for implementing a transaction. For example, the security module may be implemented on a web server, notebook computer, desktop computer, smart phone, or other electronic device configured to interact with a customer for conducting a purchase transaction. The security module may detect user input during the interaction and adjust a security level to one of multiple security levels based on the interaction. One or more actions may be associated with each security level. The security module may implement the action(s) in response to adjusting to the security level. An action may heighten the scrutiny or attention given to the transaction. For example, in approving customer credentials for purchasing items, heightened scrutiny may be given to approval of the customer's credentials in response to determining that a biometric characteristic of the customer may indicate dishonesty.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or diagrams of methods, apparatus (systems) and computer program products according to embodiments of the invention. For example, aspects of the present invention are described with reference to the diagram of FIG. 1 and the flowcharts of FIGS. 2 and 3. It will be understood that each block of the flowchart illustrations and/or diagrams, and combinations of blocks in the flowchart illustrations and/or diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   capturing, by a processor, at least one of a physiological and a psychological response from a customer at a transaction terminal for purchase of a product;
   capturing, by the processor, measurement information of the product;
   storing, in memory via a processor, the captured measurement information of the product;
   determining, by the processor, a biometric characteristic of the customer based on the at least one of the physiological and the psychological response of the customer;
   determining, by the processor, an honesty level of the customer based on an analysis of the biometric characteristic;
   verifying, by the processor, whether the honesty level of the customer meets a predetermined honesty level;
   adjusting, by the processor, a security level of the transaction terminal based on the biometric characteristic of the customer and whether the honesty level of the customer meets the predetermined honesty level;
   retrieving, from the memory via the processor, expected measurement information of the product stored in memory;
   determining, by the processor, a tolerance range and a match level of the product based on the biometric characteristic of the customer, a comparison between the retrieved expected measurement information and the captured measurement information from the product;

increasing, by the processor, the match level when comparing the retrieved expected measurement information and the captured measurement information from the product;

and deactivating, by the processor, the transaction terminal when the match level is outside the tolerance range.

2. The method of claim 1, wherein the at least one of the physiological and the psychological response is a measure of at least one of a speech pattern, eye movement, facial movement, heart rate, blood pressure, body temperature, and perspiration of the customer.

3. The method of claim 1, further comprises:

evaluating, by the processor, the customer;

presenting, by the processor via a user interface, at least one question to the customer; and receiving a response of the customer to the at least one question, and analyzing the biometric characteristic based on the response of the customer.

4. The method of claim 3, wherein the transaction terminal comprises at least one of a touch, visual, and audio sensor, and wherein evaluating a customer at the transaction terminal comprises using the at least one of the touch, visual, and audio sensor to evaluate the customer.

5. The method of claim 4, further comprising displaying an image at the transaction terminal, and wherein determining a biometric characteristic of the customer comprises using the at least one of the touch, visual, and audio sensor to determine the honestly level of the customer in response to displaying the image at the transaction terminal.

6. The method of claim 1, wherein adjusting a security level of the transaction system comprises adjusting the security level of the transaction system to one of a plurality of security levels that are each associated with at least one biometric characteristic.

7. The method of claim 6, further comprising implementing a predetermined action in response to adjusting the security level.

8. The method of claim 7, further comprises adjusting product checkout criteria of the transaction terminal.

9. The method of claim 1, further comprising determining a biometric characteristic history of the customer based on a plurality of interactions with the customer.

10. The method of claim 9, wherein adjusting a security level of the transaction system comprises adjusting the security level of the transaction system based on the biometric characteristic history.

11. A system comprising:

a processor and memory;

a user interface of a transaction terminal that interacts with a customer for purchase of a product; and a security module, which when executed by the program code stored in memory, instructs the processor to:

capture at least one of a physiological and a psychological response from a customer at a transaction terminal for purchase of a product;

capture measurement information of the product;

store the captured measurement information of the product;

determine a biometric characteristic of the customer based on the capture of at least one of the physiological and the psychological response of the customer;

determine an honesty level of the customer based on an analysis of the biometric characteristic;

verify whether the honesty level of the customer meets a predetermined honesty level;

adjust a security level of the transaction terminal based on the biometric characteristic of the customer and whether the honesty level of the customer meets the predetermined honesty level;

retrieve expected measurement information of the product stored in memory;

determine a tolerance range and a match level of the product based on the biometric characteristic of the customer, a comparison between the retrieved expected measurement information and the captured measurement information from the product;

increase, by the processor, the match level when comparing the retrieved expected measurement information and the captured measurement information from the product;

and deactivate the transaction terminal when the match level is outside the tolerance range.

12. The system of claim 11, wherein the at least one of the physiological and the psychological response is a measure of at least one of a speech pattern, eye movement, facial movement, heart rate, blood pressure, body temperature, and perspiration of the customer.

13. The system of claim 11, wherein the security module is configured to control the user interface to:

present at least one question to the customer; and receive a response of the customer to the at least one question, and wherein the security module is configured to determine a biometric characteristic based on the response of the customer.

14. The system of claim 11, wherein the user interface of the transaction terminal comprises at least one of a touch, visual, and audio sensor for interacting with the customer.

15. The system of claim 14, wherein the security module is configured to control the user interface to display an image at the transaction terminal to invoke a response from the customer, and wherein the security module is configured to create the biometric characteristic of the customer using the at least one of the touch, visual, and audio sensor to determine the honesty level of the customer in response to displaying the image at the transaction terminal.

16. The system of claim 11, wherein the security module is configured to adjust product checkout criteria of the transaction terminal in response to adjusting the security level.

17. A computer program product for adjusting a security level of a transaction system, said computer program product comprising:

a computer readable storage medium having computer readable program code embodied therewith, the computer readable program code comprising instructions to:

capture at least one of a physiological and a psychological response from a customer at a transaction terminal for purchase of a product;

capture measurement information of the product;

store the captured measurement information of the product;

determine a biometric characteristic of the customer based on the capture of at least one of the physiological and the psychological response of the customer;
determine an honesty level of the customer based on an analysis of the biometric characteristic;
verify whether the honesty level of the customer meets a predetermined honesty level;
adjust a security level of the transaction terminal based on the biometric characteristic of the customer and whether the honesty level of the customer meets the predetermined honesty level;
retrieve expected measurement information of the product stored in memory;
determine a tolerance range and a match level of the product based on the biometric characteristic of the customer, a comparison between the retrieved expected measurement information and the captured measurement information from the product;
increase, by the processor, the match level when comparing the retrieved expected measurement information and the captured measurement information from the product;
and
deactivate the transaction terminal when the match level is outside the tolerance range.

18. The computer program product of claim 17, wherein the computer readable program code comprises:
computer readable program code configured to present at least one question to the customer at the user interface;
computer readable program code configured to receive a response of the customer to the at least one question; and
computer readable program code configured to determine the biometric characteristic based on the response of the customer.

\* \* \* \* \*